US008744813B2

(12) United States Patent
Lacaille et al.

(10) Patent No.: US 8,744,813 B2
(45) Date of Patent: Jun. 3, 2014

(54) DETECTION OF ANOMALIES IN AN AIRCRAFT ENGINE

(75) Inventors: Jerome Lacaille, Rosny Sous Bois (FR); Rostand Nya Djiki, Lieusaint (FR)

(73) Assignee: SNECMA, Paris (FR)

( * ) Notice: Subject to any disclaimer, the term of this patent is extended or adjusted under 35 U.S.C. 154(b) by 269 days.

(21) Appl. No.: 13/130,840

(22) PCT Filed: Nov. 26, 2009

(86) PCT No.: PCT/FR2009/052302
§ 371 (c)(1),
(2), (4) Date: Aug. 15, 2011

(87) PCT Pub. No.: WO2010/061136
PCT Pub. Date: Jun. 3, 2010

(65) Prior Publication Data
US 2011/0288836 A1    Nov. 24, 2011

(30) Foreign Application Priority Data

Nov. 28, 2008  (FR) ...................................... 08 58088

(51) Int. Cl.
*G05B 23/02* (2006.01)
*G06F 17/18* (2006.01)

(52) U.S. Cl.
CPC .......... *G05B 23/024* (2013.01); *G05B 23/0254* (2013.01); *G06F 17/18* (2013.01); *G06F 2201/81* (2013.01); *F05D 2220/323* (2013.01)
USPC ................. 703/2; 702/71; 702/183; 702/184; 702/185

(58) Field of Classification Search
CPC .......... F05D 2260/81; F05D 2220/323; G05B 23/0221; G05B 23/0224; G05B 23/024; G05B 23/0254; G06F 17/18; G06F 2201/81
USPC ........... 703/2; 702/66, 71, 113, 181, 183–185
See application file for complete search history.

(56) References Cited

U.S. PATENT DOCUMENTS 7,415,328 B2 *  8/2008  Volponi ............................. 703/2
7,797,113 B2 *  9/2010  Yoshida et al. .................... 703/8
(Continued)

FOREIGN PATENT DOCUMENTS

EP    1 677 172     7/2006
EP    1 705 542     9/2006
(Continued)

OTHER PUBLICATIONS

Sarkar, Soumik, et al. "Fault Diagnosis and Isolation in Aircraft Gas Turbine Engines" AACC American Control Conference, pp. 2166-2171 (Jun. 2008) available from <http://ieeexplore.ieee.org/xpls/abs_all.jsp?arnumber=4586813>.*

(Continued)

*Primary Examiner* — Mary C Jacob
*Assistant Examiner* — Jay B Hann
(74) *Attorney, Agent, or Firm* — Oblon, Spivak, McClelland, Maier & Neustadt, L.L.P.

(57) ABSTRACT

A method and system for detecting anomalies in an aeroengine. The method and system define a behavior model of a controller of the aeroengine using a time regression modeling the behavior of the controller as a function of a data set relating to the controller and including measurements of past behaviors and command and state measurements of the controller; continuously recalculate the behavior model for each new data set; and monitor statistical variation of the behavior model to detect a behavior anomaly of the controller representing an operating anomaly of the engine.

14 Claims, 5 Drawing Sheets

(56) References Cited

U.S. PATENT DOCUMENTS

| | | | |
|---|---|---|---|
| 7,853,433 B2* | 12/2010 | He et al. | 702/182 |
| 8,121,818 B2* | 2/2012 | Gorinevsky | 702/183 |
| 8,301,406 B2* | 10/2012 | Lee et al. | 702/77 |
| 8,352,216 B2* | 1/2013 | Subbu et al. | 702/185 |
| 2005/0222747 A1 | 10/2005 | Vhora et al. | |
| 2006/0142976 A1 | 6/2006 | Bonanni et al. | |
| 2006/0217870 A1 | 9/2006 | Hoff et al. | |
| 2008/0120074 A1 | 5/2008 | Volponi | |
| 2008/0262663 A1 | 10/2008 | Ausloos et al. | |
| 2009/0043447 A1* | 2/2009 | Vershinin et al. | 701/34 |
| 2009/0143871 A1* | 6/2009 | Gao et al. | 703/2 |

FOREIGN PATENT DOCUMENTS

| | | |
|---|---|---|
| EP | 1 926 001 | 5/2008 |
| EP | 1 953 614 | 8/2008 |

OTHER PUBLICATIONS

Tolani, Devendra, et al. "Anomaly Detection in Aircraft Gas Turbine Engines" J. Aerospace Computing, Inf., & Comm., vol. 3 (Feb. 2006) available from <http://arc.aiaa.org/doi/abs/10.2514/1.15768?journalCode=jacic>.*

Rajagopalan, Venkatesh "Symbolic Dynamic Filtering of Complex Systems" PhD Thesis, Pennsylvania State U., (2007) available from <https://etda.libraries.psu.edu/paper/7570/2845>.*

Kobayashi, Takahisa; Simon, Donald L. "Evaluation of an Enhanced Bank of Kalman Filters for In-Flight Aircraft Engine Sensor Fault Diagnostics" NASA (2004) available from <http://oai.dtic.mil/oai/oai?verb=getRecord&metadataPrefix=html&identifier=ADA426769>.*

Sarkar, S, et al. "Fault Detection and Isolation in Aircraft Gas Turbine Engines. Part 2: Validation on a Simulation test Bed" Proc. IMechE, vol. 222, Part G: J. Aerospace Engineering (Feb. 2008) available at <http://www.me.psu.edu/Ray/journalAsokRay/2008/188SarkarYasar08Part02.pdf>.*

Rajagopalan, V. & Ray, A. "Symbolic Time Series Analysis via Wavelet-Based Partitioning" Signal Processing, vol. 86, No. 11, pp. 3309-3320 (2006).*

Bourke, Paul "AutoRegression Analysis (AR)" (1998) available at <http://paulbourke.net/miscellaneous/ar/>.*

Unser, Michael & Blu, Thierry "Wavelet Theory Demystified" IEEE Trans. on Signal Processing, vol. 51, No. 2, pp. 470-483 (2003).*

International Search Report issued Feb. 4, 2010 in PCT/FR09/52302 filed Nov. 26, 2009.

* cited by examiner

DETECTION OF ANOMALIES IN AN AIRCRAFT ENGINE

FIELD OF THE INVENTION

The present invention relates to the field of monitoring an aeroengine. In particular, the invention relates to detecting anomalies in control means of the aeroengine. More particularly, the invention relates to detecting operating anomalies of a circuit for regulating stator valves on the compressors of a turbojet.

In numerous industries, such as aviation or space, it is common practice to make use of monitoring tools.

Nevertheless, monitoring or detecting anomalies of an aeroengine is often performed by observing a very large number of elements of the engine in a manner that is independent and discontinuous over time.

Such observations give rise to a very large amount of data that requires a considerable amount of calculation time in order to be analyzed.

Furthermore, it can happen that an anomaly is indicated in error or even that an element of the engine is faulty without the event being detected as a result of a lack of any pertinent indicator continuously monitoring proper operation of said element.

OBJECT AND SUMMARY OF THE INVENTION

The present invention provides a method of detecting anomalies in an aeroengine, the method comprising the following steps:

- defining a behavior model for control means of said aeroengine by using time regression that models the behavior of said control means as a function of a data set relating to said control means and including measurements of past behaviors, and state and control measurements of said control means;
- continuously recalculating said behavior model for each new data set; and
- monitoring the statistical variation of said behavior model in order to detect a behavior anomaly of said control means representing an operating anomaly of said engine.

Thus, the method makes it possible to use a coarse model using a minimum number of measurements and optimized calculation time to detect a behavior anomaly of the engine. In particular, by recalculating a coarse model of the behavior of the control means in successive manner while using very few measurements each time, and by tracking variation of the model over time, it is possible by anticipation to detect drift of the control means.

The method also includes the following steps:

- collecting an initial data set relating to said control means;
- splitting said initial data set into a plurality of uniform intervals representing different flight regimes identified by regime indicators defined using criteria established by experts; and
- defining a reference behavior model for each flight regime.

Thus, the method takes account of the utilization conditions of the engine and incorporates a tool for analyzing and classifying flight stages to enable operation to be continuous. Furthermore, for conditional maintenance requirements, it suffices to apply the method during tests for which external conditions are stabilized and predefined.

The method also includes the following steps:

- acting over time to collect a current data set relating to said control means;
- storing the content of said current data set for a predetermined time period in a memory buffer;
- from said current data set, calculating estimated regime indicators to identify a current flight regime specific to said predetermined time period;
- calculating a current behavior model corresponding to said current data set and to said current flight regime;
- estimating a behavior distance between said current behavior model and said reference behavior model corresponding to said current flight regime; and
- detecting a behavior anomaly of said control means when said behavior distance is greater than a predetermined normality threshold.

Thus, once the behavior model has been calibrated, it is easily applied in real time by focusing attention on the behavior of a small number of elements of the engine and by calculating the distance between the reference model and the current model in order to detect an operating failure of the engine. Naturally, detecting the failure can subsequently make it easier to locate the failure.

In a second aspect of the present invention, said behavior model is a rational filter defined in the following steps:

- standardizing said initial data set by subtracting a lowpass filter and normalizing relative to local variance estimated for each flight regime;
- defining a plurality of mathematical formulae, each formula expressing an output vector at a present instant y(t) representing a current behavior of said control means as a function of output vectors at preceding instants y(t−i) representing earlier behavior measurements and as a function of input vectors comprising an input vector at a present instant x(t) and input vectors at preceding instants x(t−i), each input vector x being constructed by concatenating said command and state measurements of said control means;
- using said plurality of mathematical formulae to define a reference rational filter for each flight regime; and
- using said plurality of mathematical formulae to calculate a current rational filter relating to said current data set and to said current flight regime.

Thus, by modeling the control means using a rational filter, a very good extrapolator is obtained that requires very little calculation time and that makes it possible to detect meaningful variations of behavior from a model that is coarse.

Each mathematical formula of said plurality of mathematical formulae may correspond to a linear equation between said output and input vectors $\underline{y}$ and $\underline{x}$ described analytically in the time domain by:

$$A(q)\underline{y} = B(q)\underline{x}$$

with A(q) being a real polynomial of the form:

$$A(q) = 1 + a_1 q^{-1} + a_2 q^{-2} + \ldots + a_{ra} q^{-ra}$$

and B(q) being a real polynomial in which each coefficient is a line vector of the same dimension as the input vector $\underline{x}$ and having the form:

$$B(q) = b_0 + b_1 q^{-1} + b_2 q^{-2} + \ldots + b_{rb} q^{-rb}$$

with $$q^{-1}(x(t)) = x(t-1)$$

Thus, the rational filter may be easily identified in unique manner by its zeros and poles in the complex plane. This makes it easy to follow variation in the states of the behavior model.

In a variant, the method comprises
- extracting current zeros and poles of the polynomials associated with said current rational filter corresponding to said current flight regime;
- using expert criteria to calculate normality indicators for said current flight regime from said current zeros and poles and from other information representing an acquisition context relating to said control means; and
- detecting a behavior anomaly of said control means when a distance between said normality indicators and a corresponding normality threshold is greater than a predetermined value.

Thus, from unique characteristics (zeros and poles) of rational fractions, it is possible to define a distance that makes it easy to track statistical variation of these characteristics in order to detect a behavior anomaly of the control means.

In a variant, the method comprises:
- using a function adapted to the dynamic range of said control means to define a distance; and
- detecting a behavior anomaly of said control means when said distance between the reference rational filter and the current rational filter is greater than a predetermined value.

Thus, it is possible to use a more general criterion directly without making use of the zeros and poles in order to detect a behavior anomaly of the control means.

In an example of the present invention, said control means correspond to a regulator circuit that operates actuators controlling stator valves on a low pressure compressor and a high pressure compressor of a turbojet and serving to modify the geometries of said compressors as a function of the flight regime, and said data set relating to said regulator circuit includes data about the positions of the actuators and external data including a first speed of rotation N1 of a shaft of said low pressure compressor, a second speed of rotation N2 of a shaft of said high pressure compressor, a pressure P downstream from the compressors, a fuel flow rate W, and a command $\underline{u}$ for the actuators.

Thus, the method serves to detect by anticipation any drift of the valve regulator circuit by observing variation of a very small number of parameters.

In this example, the method comprises the following steps:
- defining a stationary regime discrete autoregressive filter for modeling the behavior of an output variable at a present instant y(t) corresponding to the current positions of the actuators as a function of output variables at preceding instants y(s; s<t) corresponding to earlier positions of the actuators and as a function of input variables $$x(s)=(x_j(s); s \leq t)_{j=1 \ldots k}$$

corresponding to said external data at past and present instants, said autoregressive filter being expressed in a frequency spectrum $\underline{w}$ by a rational filter $(F_j(w))_{j=1 \ldots k}$ of polynomial fractions having the form:

$$F_j(w) = \frac{B_j(w)}{A(w)}$$

where $$B_j(w) = b_{j,0} + b_{j,1}w + \ldots + b_{j,r_j}w^{r_j}$$

and $$A(w) = 1 - a_1 w - \ldots - a_{r_0} w^{r_0}$$

- collecting initial digital data representing the initial input and output variables $(x^0(s), y^0(s))$ measured and stored during bench testing stages;
- identifying flight regimes from said initial digital data;
- calculating, for each flight regime, an optimal set of ranks $r_j$ and $r_0$ of said polynomial fractions of said rational filter $(F_j(w))_{j=1 \ldots k}$; and
- calculating, for each flight regime, a reference rational filter $(F_j^0(w))_{j=1 \ldots k}$.

This makes it possible to construct a behavior model that is effective and very easy to implement. In addition, selecting an optimum set of ranks optimizes the likelihood of the behavior model and also its robustness.

The method also includes the following steps:
- storing over time digital measurements representing input and output variables (x(s), y(s)) in a memory buffer to form an N-measurement sample:

$$I_t = \{(x(s), y(s)); s \in [t-N+1, \ldots t]\}$$

- testing the stability of said N-measurement sample;
- identifying the current flight regime and estimating the quality of its classification $$Q_{FR} \in [0,1]$$

- estimating a current rational filter $(F_j(w))_{j=1 \ldots k}$ for the optimum set of ranks associated with said current flight regime;
- comparing said current rational filter $(F_j(w))_{j=1 \ldots k}$ with the reference rational filter $(F_j^0(w))_{j=1 \ldots k}$ corresponding to the same flight regime; and
- indicating a behavior anomaly of said regulator circuit when a difference between said current rational filter $(F_j(w))_{j=1 \ldots k}$ and said reference rational filter $(F_j^0(w))_{j=1 \ldots k}$ is greater than a predetermined value.

This makes it possible to detect an anomaly of the engine merely by observing variations in the positions of the actuators as a function of external conditions and as a function of valve command inputs.

According to an aspect of the method of the present invention, the comparison between said current and reference rational filters $(F_j(w))_{j=1 \ldots k}$ and $(F_j^0(w))_{j=1 \ldots k}$ comprises the following steps:
- calculating a reference mean square error $MSE_0$ between an output variable representing a real position of the actuators as measured during bench testing stages and a corresponding output variable representing a position of the actuators as estimated by said current reference rational filter $(F_j^0(w))_{j=1 \ldots k}$;
- calculating a current mean square error MSE between a current output variable representing a real position of the actuators measured during real time measurements and a corresponding output variable representing a position of the actuators estimated by said current rational filter $(F_j(w))_{j=1 \ldots k}$;
- calculating a difference defined by a ratio $e_0$ of said current mean quadratic error MSE and said reference quadratic error $MSE_0$:

$$e_0 = \frac{MSE}{MSE_0};$$

and
- indicating an anomaly when said ratio $e_0$ is greater than a predetermined value.

According to another aspect of the method of the present invention, the comparison between said current and reference rational filters $(F_j(w))_{j=1\ldots k}$ and $(F_j^0(w))_{j=1\ldots k}$ comprises the following steps:

calculating a sequence $e=(e_j)_{j=1\ldots k}$ of local indicators $e_j$ by integration weighted by said current and reference rational filters $(F_j(w))_{j=1\ldots k}$ and $(F_j^0(w))_{j=1\ldots k}$ over a frequency bandwidth of each input variable $x_j(t)$:

$$e_j = \frac{1}{2\pi}\int (F_j(w) - F_j^0(w))|X_j(w)|^2 dw$$

with $$|X_j(w)|^2 = \int R_{jj}(\tau)e^{-iw\tau}d\tau$$

and $$R_{jj}(\tau) = E[x_j(t), x_j(t-\tau)]$$

calculating a sequence $z=(z_j)_{j=1\ldots k}$ of local scores $z_j=e_j-\hat{e}_j$ using a correlation technique between said local indicators $e_j$, where $\hat{e}_j$ is an estimator between a local indicator $e_j$ and the other local indicators:

$$\hat{e}_j = E[e_j/e_i; i \neq j] \approx c_{j,0} + \sum_{i\neq j} c_{j,i}e_i$$

with $c_{j,i}$ being regression coefficients;
calculating a global score $Z^2$ using a Mahalanobis distance:

$$Z^2 = (z-\bar{z})^T \Sigma^{-1}(z-\bar{z})$$

where $\bar{z}$ is a mean of z calculated during bench testing stages with a covariance matrix $\Sigma$;
calculating a final score $$Q_{FR} \times Z^2$$

by multiplying the global score $Z^2$ by the classification quality factor of the flight regime $Q_{FR}\in[0,1]$; and
indicating a behavior anomaly alert when the value of the final score $Q_{FR}\times Z^2$ exceeds a predetermined value.

The invention also provides a system for detecting anomalies in an aeroengine, the system comprising:

means for defining a behavior model of control means of said aeroengine by using a time regression that models the behavior of said control means as a function of a data set relating to said control means and including measurements of past behaviors and command and state measurements of said control means;

means for continuously recalculating said behavior model for each new data set; and means for monitoring statistical variation of said behavior model in order to detect a behavior anomaly of said control means representing an operating anomaly of said engine.

The invention also provides a computer program including instructions for implementing the detection method according to the above steps when it is executed by processor means.

BRIEF DESCRIPTION OF THE DRAWINGS

Other features and advantages of the device and of the method of the invention appear better on reading the following description made by way of non-limiting indication and with reference to the accompanying drawings, in which.

DETAILED DESCRIPTION OF EMBODIMENTS

Figure 1:
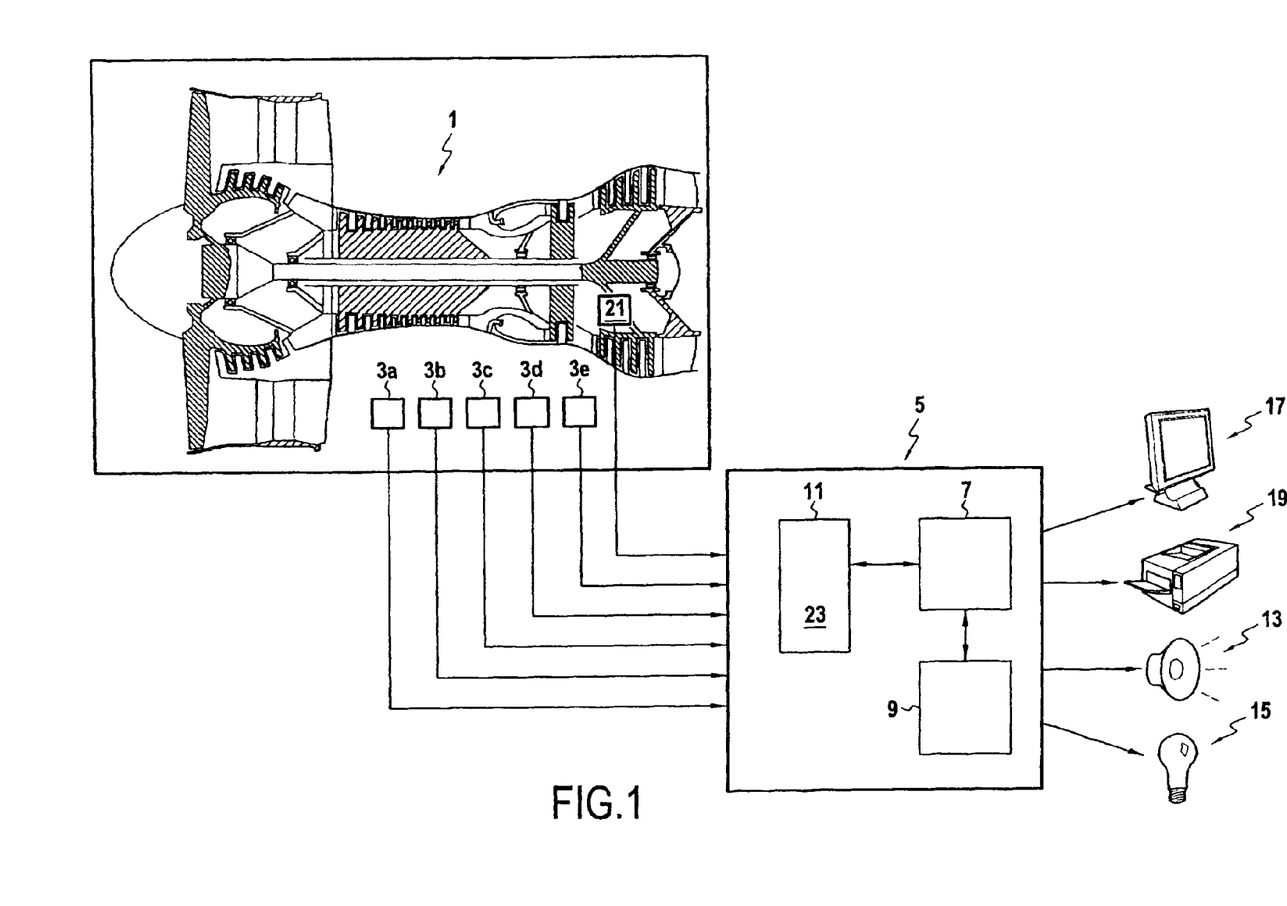
FIG. 1 is a perspective view of hardware means implemented in the system or method of the invention that is suitable for use in detecting anomalies in an aeroengine.

FIG. 1 shows hardware means implemented in the system or the method of the invention for detecting anomalies in an aeroengine or turbojet 1. The system includes a plurality of sensors 3a-3e for measuring control signals or data representative of the state of the engine 1, together with external or internal context data that might affect the operation of the engine 1. The system also has data processor means 5 such as a computer or controller suitable for use in executing a computer program designed to implement the method of the invention. The processor means 5 comprise the hardware means that are usually to be found in a computer. More particularly, these processor means 5 comprise a central unit 7 that executes the instruction sequences of the program of the method of the invention, a central memory 9 that stores the data and programs being executed, digital data storage means or media 11 that conserve data, input peripherals (sensors 3a-3e, keyboard, mouse, ...), and output peripherals (emitters of sound 13, light signals 15, screen 17, printer 19, ...) to make the result of detection available.

The invention relies on detecting an anomaly in the behavior of the engine 1 and in particular in detecting a behavior anomaly of control or regulator means 21 of the engine 1 and that represents an anomaly in the operation of the engine 1.

In accordance with the invention, the processor means 5 are configured to define a behavior model for control means 21 of the aeroengine 1 as a time regression. The behavior of the control means 21 may be modelled as a function of a data set relating to the control means 21 and comprising measurements of past behaviors and measurements of commands and/or states of the control means 21.

Furthermore, the processor means 5 are configured to recalculate this behavior model on a continuous basis for each new data set and to monitor statistical variation of the behavior model in order to detect a behavior anomaly of the control means 21. In particular, in order to facilitate calculation, it is advantageous to express the time behavior of the control means 21 by a regressive discrete model implementing a steady stochastic formulation.

Figure 2:
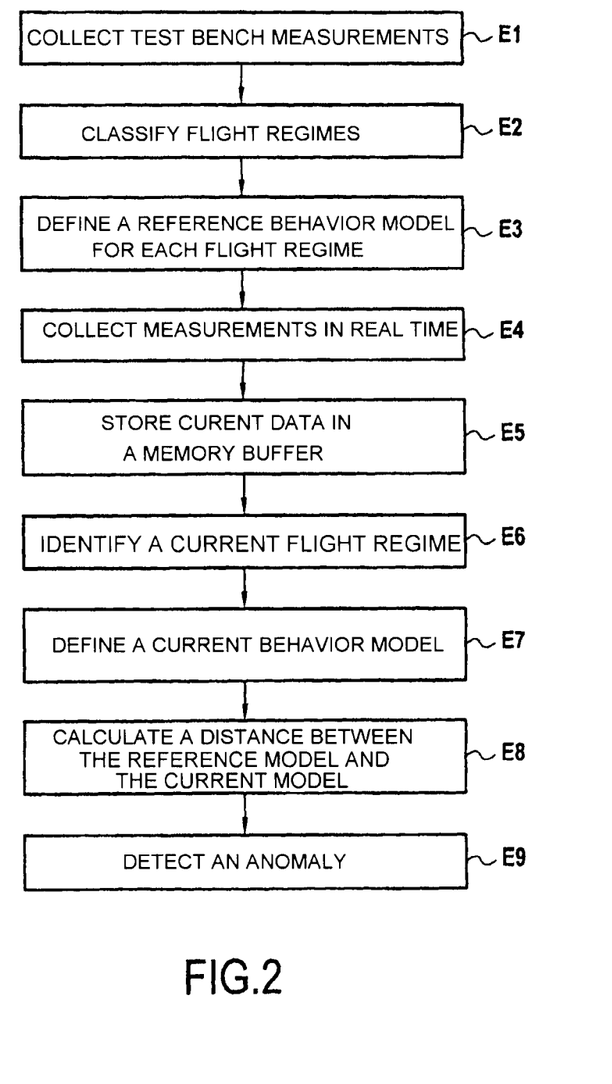
FIG. 2 is a flow chart showing the main steps in detecting an anomaly in the FIG. 1 aeroengine.

FIG. 2 shows the main steps of the method of the invention for detecting an anomaly of the aeroengine 1. It should be observed that these steps are implemented by the processor means 5 of the detector system of the invention.

Steps E1 to E3 relate to defining the behavior model as a function of measurement of past behaviors and measurements of the commands and the states of the control means 21.

Steps E4 to E7 relate to recalculating the behavior model in time for each new measurement.

Steps E8 and E9 relate to measuring the variation of the behavior model and serve to detect an anomaly of the control means 21.

In particular, in step E1, the processor means 5 are configured to collect an initial data set relating to the control means 21 and corresponding to data that is measured and stored in the storage media 11 during bench testing stages.

In step E2, the processor means 5 are configured to split up this initial data set into a plurality of uniform intervals representing intervals that are similar to those observed during real flight regimes. The various flight regimes may be identified by a plurality of regime indicators defined using criteria that are specified by experts.

This selection or splitting may be achieved in application of the definition provided by experts who propose probabilistic indicators for each of these stages. Thus, these indicators give an indication concerning the probability of being in a given flight regime for each of the identified regimes. The flight regime FR that is the most probable can then be accepted in application of a classification quality factor or criterion $$Q_{FR} \in [0,1]$$

defined by a probability threshold on the indicators.

Figure 3:
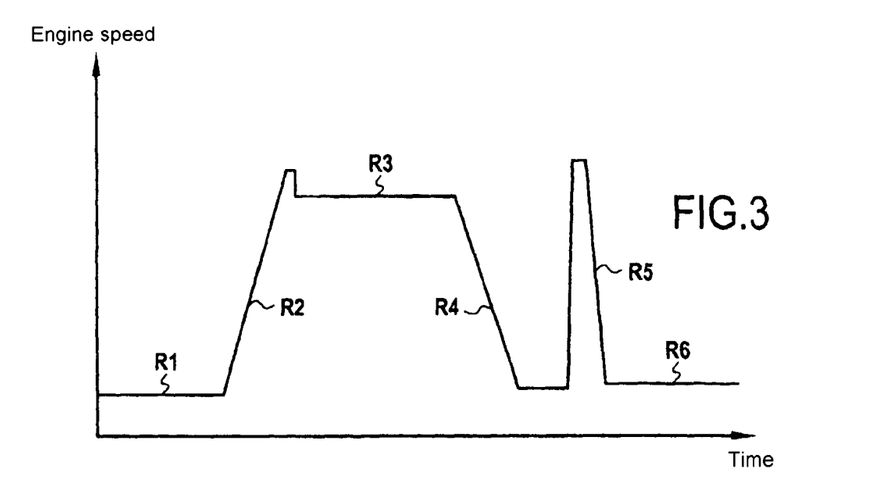
FIG. 3 is a diagram showing an example of flight regimes for the aeroengine of FIG. 1.

FIG. 3 is a diagram showing an example of flight regimes defined as a function of the speed of rotation of the engine. In this example, stable flight regimes comprise stages of idling on the ground R1 and R6 (ground idle), and a cruising stage R3. Stationary (steady) intervals or stages are defined by quasi-stationary measurements of the speed of rotation of the engine. Transition stages such as acceleration during takeoff R2, deceleration while descending R4, or reverse thrust R5 are not stationary stages and therefore cannot be used for modeling a stationary stochastic process.

Furthermore, the flight regimes may be identified essentially by three regime indicators: a minimum interval duration, a reference value indicating that an interval forms part of a specific class of the flight regime, and a tolerance value. It should be observed that given that this classification is performed essentially on the ground, it is not necessary to include other parameters such as the altitude or the attitude of the airplane.

In step E3, the processor means 5 are configured to define a reference behavior model for each flight regime suitable for predicting the behavior of the control means 21 as a function of past behaviors and as a function of other measurements both past and present.

Thereafter, the reference behavior models are applied in real time.

Thus, in step E4, the processor means 5 begin by collecting over time a current data set relating to the control means 21. This data comes, for example, from the various sensors 3a-3e sensing the environment of the engine 1.

In step E5, the processor means 5 are configured to store the content of the current data set for a predetermined period of time in a memory buffer 23, e.g. contained in the storage means 11.

In step E6, the processor means 5 are configured to use the current data set to calculate an estimate of the regime indicators to identify the current flight regime specific to the predetermined time period. If the current flight regime is identified, then the method moves on to the following step E7, otherwise new data continues to be acquired.

When the current flight regime is identified, the processor means 5 are configured during a step E7 to calculate a current behavior model corresponding to the current data set and to the current flight regime. The current behavior model is calculated using the definition of step E3 relating to the reference behavior model corresponding to the same flight regime.

In step E8, the processor means 5 are configured to estimate a behavior distance between the current behavior model and the reference behavior model corresponding to the same flight regime.

Then, in step E9, the processor means 5 are configured to detect a behavior anomaly of the control means 21 when the behavior distance is greater than a predetermined normality threshold.

By way of example, the behavior of the control means 21 may be modelled by a rational filter based on linear or non-linear rational functions. In particular, the rational filter may be very effective in modeling an autoregressive stationary process.

Figure 4:
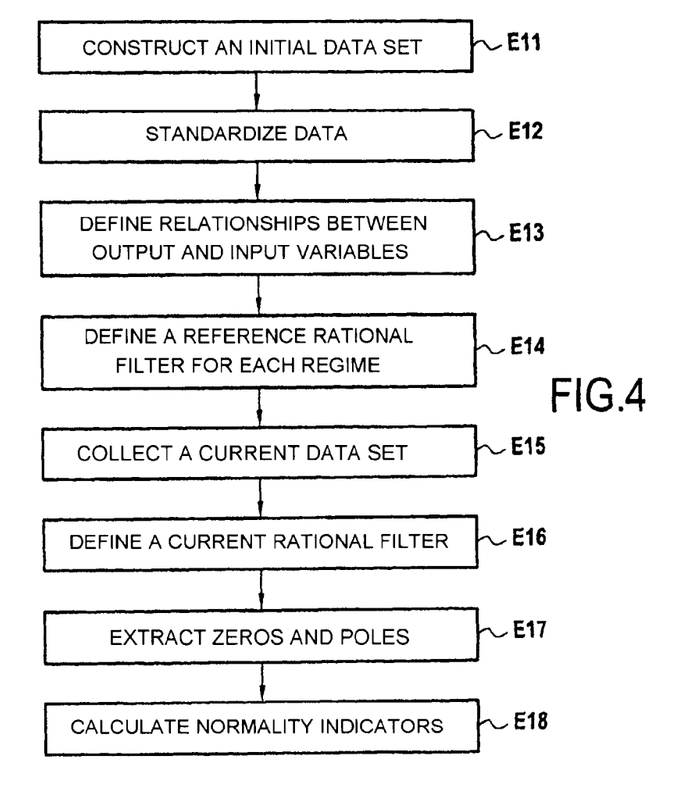
FIG. 4 is a flow chart showing the main steps in modeling the behavior of means for monitoring the aeroengine by a rational filter of the invention.

FIG. 4 shows the main steps for modeling the behavior of the control means 21 by a rational filter.

In step E11, the processor means 5 are configured to construct an initial data set corresponding to the digital data measured and stored during stages of bench testing the control means 21 for each flight regime in order to calibrate the rational filter.

In step E12, the processor means 5 are configured to standardize this digital data by subtracting a lowpass filter and normalizing relative to a local variance estimated for each flight regime.

In step E13, the processor means 5 are configured to define a plurality of mathematical formulae. Each formula may for example express an output sector y(t) at a present instant t representing the current behavior of the control means 21 as $\bar{a}$ function of output vectors y(t−i) at preceding instants (i.e. at instants t−1, . . . , t−i, . . . , 0) representing earlier behavior measurements and as a function of input vectors comprising a current input vector at a present instant x(t), and input vectors x(t−i) at preceding instants. Each input vector x (current or preceding) may be constructed by concatenating (current or earlier) command and state measurements of the control means 21.

By way of example, each mathematical formula may correspond to a relationship between the output vectors y and the input vectors x described analytically in the time domain by a linear equation having the form:

$$A(q)\underline{y} = B(q)\underline{x}$$

where A(q) is a real polynomial in which the highest-degree term is equal to 1, of the form:

$$A(q) = 1 + a_1 q^{-1} + a_2 q^{-2} + \ldots + a_{ra} q^{-ra}$$

and B(q) is a real polynomial in which each coefficient is a line vector of the same dimension as the input vector $\underline{x}$, having the form:

$$B(q) = b_0 + b_1 q^{-1} + b_2 q^{-2} + \ldots + b_{rb} q^{-rb}$$

where $q^{-1}$ is a delay operator defined by:

$$q^{-1}(x(t)) = x(t-1)$$

These polynomials may be identified uniquely by their roots (zeros and poles) in the complex plane.

In step E14, the processor means 5 are configured to use the plurality of mathematical formulae to define a reference rational filter (corresponding to the reference behavior model) for each flight regime.

The first calibration step of the rational filter consists in defining the ranks of the polynomials A(q) and B(q). A value needs to be selected for the degree of the polynomial A(q), and also for the degree of each polynomial defined by B(q) and for each of the tracked variables.

Since the likelihood of a model increases naturally with the number of parameters used by the model, it is then advantageous to use a compensation criterion that makes it possible to monitor effectively the quality of the estimated model and its robustness.

The coefficients of the polynomials may be calculated by a conventional interpolation and prediction technique by performing regression on the values measured during the modeling procedure satisfying the autoregressive equations. To select ranks, these regressive techniques are applied to a large volume of data, thereby making it possible simultaneously to estimate the coefficient of the polynomials, to estimate the compensation likelihood, and to test the robustness of the behavior model. Robustness is a measure of the quality of the model that is performed on data that was not used for estimating the coefficients of the behavior model.

The ranks that are retained for the autoregressive linear equations are those that optimize the likelihood of the behavior model and its robustness according to criteria determined by expertise.

Once the rational filter has been calibrated, it is suitable for application in real time. Thus, in step E15, the processor means 5 are configured to act over time to collect and store in the buffer memory 23 the current data set relating to the control means 21.

Advantageously, the memory buffer 23 is of a fixed size defined with the help of the ranks estimated in the preceding step and of the minimum volume of data needed to identify a flight regime and to apply the regression techniques needed for calculating the coefficients of the polynomials A(q) and B(q). The memory buffer 23 may operate as a sliding buffer such that the oldest data is eliminated so as to leave room for new measurements.

At each instant, the flight regime indicators are estimated. This estimation should lead to one of the flight regimes being accepted throughout the period of measurements stored in the memory buffer 23. If a specific regime is identified, then the method moves on to the following step E16.

In step E16, once the current regime has been identified, the processor means 5 are configured to use a plurality of mathematical formulae to calculate a current rational filter (corresponding to the current behavior model) relating to the current data set and to the current flight regime.

The selection or calculation of the current rational filter includes an approximation of the standardization corresponding to the current flight regime and executing the training technique of the autoregressive model. This calibration is performed on the data of the memory buffer 23 in order to deduce expressions therefrom for the polynomials A(q) and B(q) by using a method of adapting coefficients as previously calculated during calibration on the ground. It is sometimes possible for some of the calculated coefficients to be unreliable. Under such circumstances, the method passes directly to the following step E17.

The linear rational filter cannot be defined by unique indicators (zeros and poles) that are more stable than the coefficients of the polynomials.

In step E17, the processor means 5 are configured, for each flight regime, to extract current zeros (roots of B(q)) and poles (roots of A(q)) in the complex plane of the polynomials A(q) and B(q) associated with the current rational filter. After preprocessing serving to conserve only real magnitudes (e.g. the modulus and the phase of a pair of complex conjugate zeros), these current zeros and poles are stored in a table (e.g. stored in the storage means 11) together with other information representing the acquisition context relating to the control means 21 of the engine 1 (e.g. outside temperature, pressure, airplane altitude, etc.).

The tables as created in this way for each flight regime can be used by a calibration procedure (described below) that enables the distribution of the coefficients to be defined that leads to a definition of normality thresholds (i.e. normality rejection tests for the control means 21), e.g. in compliance with expert criteria.

In the event of a normality indicator, calculated as likelihood under normal assumptions for poles and zeros, crossing one of these normality thresholds gives rise to an anomaly alert being issued. Decision logic can then be implemented in order to manage the occurrence of these events and to manage alarms.

It should be observed that after calculating and storing the zeros and poles of the rational filter over time for a specific flight regime, the calibration procedure consists initially in applying a readjustment to each coefficient by regression on the contextual measurements and on the other coefficients in order to be released from the acquisition context.

Thereafter, the deviation with respect to the regression rational filter are modelled by estimating the distribution of the vector of the readjusted coefficients seen as a whole. For example, it is possible to use a Hotelling T-square as a model for distribution estimation.

The parameters of this distribution model are estimated on a data series that is deemed to be normal by experts. The normality thresholds are defined as being quantities on this distribution. This model makes it possible to distinguish between that which appears as ordinary noise, and a modification in the behavior of the control means 21.

Thus, in order to detect an anomaly, if any, for a current flight regime, the processor means 5 are configured in step E18 to calculate normality indicators on the basis of expert criteria and from the current zeros and poles and from other information representative of the acquisition context relating to the control means 21. The processor means 5 can then detect an anomaly in the behavior of the control means 21 when a distance between the normality indicators and a corresponding normality threshold is greater than a predetermined value.

It should be observed that it is also possible to estimate a distance using a function adapted to the dynamic range of the control means 21 without making use of the zeros and poles, e.g. by making use of residual energy variation. Under such circumstances, a behavior anomaly in the control means 21 can be detected when the distance between the reference rational filter and the current rational filter is greater than a predetermined value.

In an example of the present invention, the control means 21 correspond to a regulator circuit that operates actuators that control stator valves on compressors of a turbojet.

Figure 5:
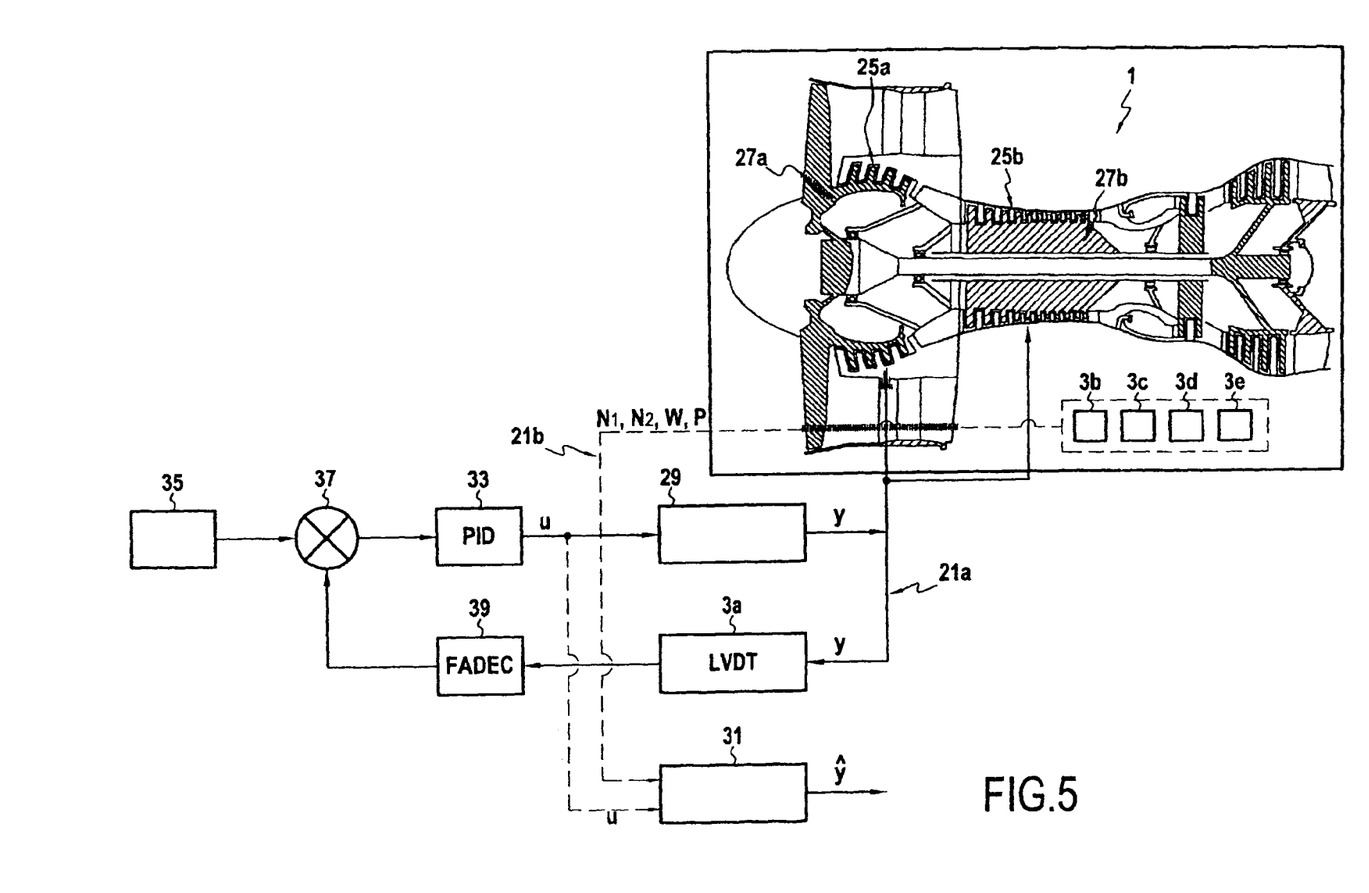
FIG. 5 is a highly diagrammatic view of an example of a detector system of the invention for a regulator circuit of the aeroengine.

FIG. 5 is a highly diagrammatic view of an example of the detector system of the invention including a regulator circuit 21a (drawn in continuous lines) and a servo-control loop 21b (drawn in dashed lines) in order to detect an operating anomaly of stator valves 25a, 25b on axial compressors 27a, 27b of a turbojet 1.

In general, a turbojet 1 has a low pressure (LP) compressor 27a upstream and a high pressure (HP) compressor 27b downstream.

Furthermore, the stator valves 25a, 25b serve to modify the geometry of a compressor 27a, 27b as a function of the flight regime, of external conditions, and of command inputs. They are controlled by the closed regulator circuit 21a that operate two actuators 29 (e.g. hydraulic actuators) that are coupled together. Naturally, the actuators 29 could equally well be electromechanical or electrical.

Thus, in this example, the control means 21 correspond to the regulator circuit 21*a* that operate the actuators 29 and that is modelled by the servo-control loop 21*b* that includes a rational filter 31.

The position or movement y at the outlets of the actuators 29 is measured by a linear variable differential transfer (LVDT) position sensor 3*a*. The actuators 29 are controlled by an input command u delivered by a proportional integral derivative (PID) regulator 33.

The input command u is defined by a setpoint 35 as a function of a piloting power request corrected via an arithmetic operator 37 by means of a command value transmitted by the full authority digital engine controller (FADEC) 39. The FADEC 39 calculates the command value as a function of the outlet position y of the actuators as measured by the LVDT position sensor 3*a*.

Furthermore, in addition to the command measurement u and the position measurement y relating to the actuators 29, the system includes other measurements relating to the environment of the engine 1. Thus, the system has sensors 3*b*-3*e* for measuring respectively the speed of rotation N1 of the low pressure compressor shaft, the speed of rotation N2 of the high pressure compressor shaft, the pressure P downstream from the compressors, and the fuel flow rate W.

Thus, the servo-control loop 21*b* shows that the rational filter 31 models the position ŷ of the actuators (output of the filter 31) as a function of input data comprising the real positions y of the actuators, the input command u, and the external measurements of the engine environment comprising the speeds N1 and N2 of the HP and LP compressors, the fuel flow rate W, and the air pressure P.

It should be observed that knowing the following parameters of a hydraulic actuator: cylinder volume V, piston area A, fluid density ρ, bulk modulus κ of the fluid, equivalent load mass m, load stiffness K, and damping c, and also certain measurements of external and internal leakage L, it is possible to define a relationship between the command u and the position y of the actuator 29 by means of an analytic formula that is continuous in time t as follows:

$$\left(\frac{\rho V m}{\kappa A}\right)\frac{d^3 y}{dt^3} + \left(\frac{\rho V c}{\kappa A} + \frac{Lm}{A}\right)\frac{d^2 y}{dt^2} + \left(A\rho + \frac{\rho V K}{\kappa A} + \frac{Lc}{A}\right)\frac{dy}{dt} + \left(\frac{LK}{A}\right)y = bu$$

This time formulation between the position y of the actuator 29 and the input command u for the actuator 29 illustrates the behavior of the regulator circuit 21*b* and may be reasonably approximated by a stationary regime discrete autoregressive filter. The digital regression may be expressed by a stochastic equation that is discrete in time, as follows:

$$y(t) = \sum_{i=1}^{r_0} a_i y(t-i) + \sum_{j=1}^{k} \sum_{i=0}^{r_j} b_{j,i} x_j(t-i)$$

The variables $x_j$ group together all of the k external inputs comprising the input command u, the measurements of the environment of the engine 1, and possibly also other context measurements relating to the regulator circuit 21*a*. This discrete equation may be expressed in vector manner of the form:

ay=bx by writing $$a = (a_0 = 1, -a_i)_{i=1 \ldots r_0}$$

and $$b = (b_{j,i})_{i=0 \ldots r_i}^{j=1 \ldots k}.$$

The vector parameters a and b are state parameters since they describe the relationship between the context, the command, and the position.

Thus, the stationary state discrete autoregressive filter serves to model the behavior of an output variable at a present instant y(t) corresponding to the current position of the actuators 29 as a function of output variables at preceding instants y(s; s<t) corresponding to earlier positions of the actuators 29 and as a function of input variables $$x(s) = (x_j(s); s \le t)_{j=1 \ldots k}$$

corresponding to external data at present and preceding instants. This autoregressive filter may be expressed in a frequency spectrum w by a rational filter $(F_j(w))_{j=1 \ldots k}$ 31 of polynomial fractions having the form:

$$F_j(w) = \frac{B_j(w)}{A(w)}$$

where $$B_j(w) = b_{j,0} + b_{j,1} w + \ldots + b_{j,r_j} w^{r_j}$$

and $$A(w) = 1 - a_1 w - \ldots - a_{r_0} w^{r_0}$$

A good criterion for testing the suitability of the model corresponds, for example, to measuring the mean square error (MSE) for a number N of samples between the measured real position y(t) of the actuators 29 and the position ŷ(t) of the actuators 29 as estimated by the filter using the following formula:

$$MSE = \frac{1}{N} \sum (y(t) - \hat{y}(t))^2$$

Figure 6A:
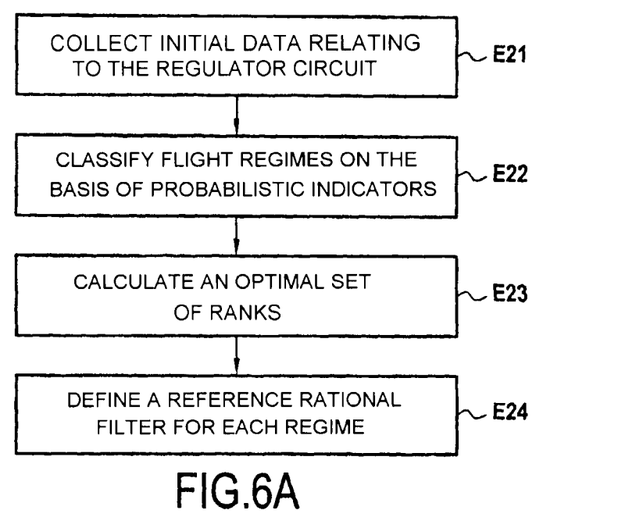
FIGS. 6A and 6B show the main steps for modeling the behavior of the FIG. 5 regulator circuit.
Figure 6B:
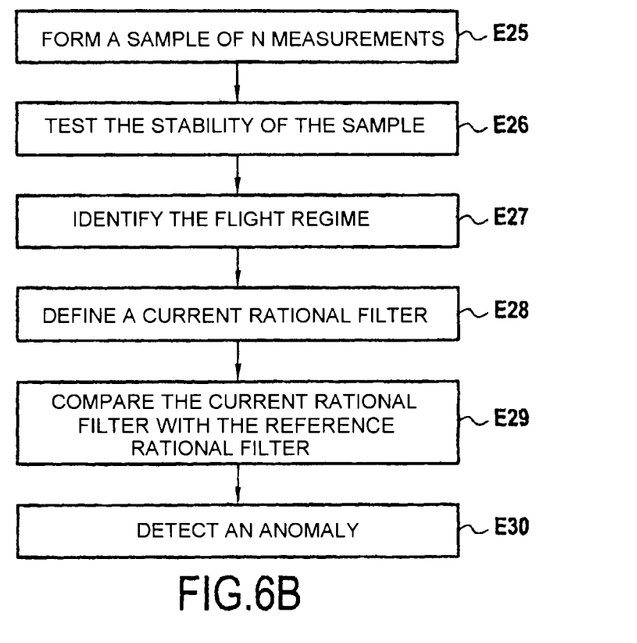

FIGS. 6A and 6B show the main steps for modeling the behavior of the regulator circuit 21*a* by the rational filter 31.

It should be observed that these figures and the preceding figures are also illustrations of the main means of the system of the invention for detecting anomalies of the aeroengine 1.

More particularly, FIG. 6A shows calibration of the rational filter 31 during measurements on the ground.

In step E21, the processor means 5 are configured to monitor the operation of the engine 1 in order to collect initial digital data representative of initial input and output variables $(x^0(s), y^0(s))$ as measured and stored during bench testing stages.

This initial digital data serves to identify or classify flight regimes and to determine the parameters of the polynomials.

Thus, in step E22, the processor means 5 are configured to classify flight regimes using probabilistic indicators (as proposed by experts) for each of these stages.

In step E23, after classifying flight regimes, the processor means 5 are configured to use regression techniques for each flight regime to calculate an optimum set of ranks $r_j$ and $r_0$ of the polynomial fractions associated with the rational filter $(F_j(w))_{j=1 \ldots k}$ 31. This may enable the processor means 5 in step E24 to define for each flight regime a reference rational filter $(F_j^0(w))_{j=1...k}$ that serves to predict the output positions of the actuators 29 as a function of earlier positions and as a function of other past and present measurements.

More particularly (for steps E23 and E24), the data corresponding to each flight regime is initially normalized by using external context information, e.g. comprising the mean speed of rotation.

After normalizing the digital data, it is possible to construct the input vector $$x=(N_1,N_2,P,W,u)$$

by concatenating the measurements comprising: the speeds of rotation $N_1$ and $N_2$ of the compressor shafts, the pressure P downstream from the compressors, the fuel flow rate W, and the valve command u. It should be observed that the external measurements relating to the speeds of rotation provide greater robustness to the context variations.

Thereafter, for each flight regime, the ranks are calculated by optimizing the model using a maximum likelihood criterion. It is possible to use the Akaike information criterion (AIC), which is suitable for comparing models of different sizes in order to find the optimum size for the model. The AIC criterion serves to compensate for log-likelihood log(L) in the mean square error MSE by the number of estimated parameters $\underline{d}$ using the following formulae:

$$d = r_0 - 1 + \sum_{j=0}^{k} r_j,$$

$$AIC = 2d - 2\log(L)$$

$$MSE = \frac{1}{N}\sum (y(t) - \hat{y}(t))^2$$

and $$\log(L)=-N(\log(2\pi MSE)+1)$$

Minimizing the AIC criterion then corresponds to minimizing the mean square error (MSE) and to minimizing the number of estimated parameters.

Advantageously, in order to define a model that is robust relative to new data, use is made of a compensated likelihood robustness test. This test evaluates the quality of the model on data that was not used for calibrating the model. Thus, in order to test a model of a given rank $$r=(r_0, \ldots, r_k)$$

where $$r_0 \geq 1 \text{ and } r_j \geq 0$$

on a sample of size N, the model is calibrated on a first portion of the sample (e.g. on 80% of the size of the sample), and it is tested on the remaining portion.

This robustness test gives a likelihood that is specific to this selection of ranks in which the MSE is calculated on the portion of the signal that was not used for calibration. Consequently, it is possible to modify the AIC criterion so that the normalization is applied to the sample of size N in order to preserve a value that is constant and consistent. After eliminating the constant portions, a criterion $\alpha_\lambda(r)$ is obtained that is adjusted by means of a regularization parameter $\lambda$ having the following form:

$$60_\lambda(r)=\log(MSE)+\lambda d$$

Consequently, in order to select the ranks, the method begins with $r_0=(1, \ldots, 0)$ and the criterion $\alpha_0=\alpha_\lambda(r_0)$ is calculated, which criterion is equal to $\log(\sigma_2) \approx 0$ since $\underline{y}$ is normalized ($\sigma=1$) and the signal is estimated by its mean ($\mu=0$). Thereafter, for each component j of r, a new set of ranks is tested by adding a 1 to the $j^{th}$ rank. The following set of ranks $r_1$ corresponds to the set that minimizes $\alpha(r)$. As a result, the sequence $(\alpha_n)_{n=0}$ decreases until a minimum value is obtained that corresponds to the best selection for the set of ranks for the rational filter 31.

After selecting an optimum set of ranks, the parameters of the filter 31 are then calculated by a conventional regressive method, this time using all of the calibration signals. This makes it possible, for each flight regime, to obtain the reference rational filter $(F_j^0(w))_{j=1...k}$ as a function of reference polynomials $A^0(w)$ and $B_j^0(w)$ as follows:

$$F_j^0(w) = \frac{B_j^0(w)}{A^0(w)}$$

It should be observed that time regression technique makes it possible to obtain a coarse estimate for the positions y(t) of the actuators. Advantageously, the model may be improved by stabilizing the method in the vicinity of a fixed point.

Nevertheless, a coarse estimate of these parameters suffices, since it is more advantageous to know the trends of the states than the quality of the regression. Furthermore, an accurate model can easily become over-parameterized, leading to the behavior model being subjected to changes and adjustments that are fast and sudden because of variations that are non-local.

FIG. 6B shows the main steps of monitoring variation of the rational filter.

After flight regimes have been identified, a new rational filter is calculated periodically and a multivariable time signal (a(n),b(n)) is accomplished for each flight regime. The time index $\underline{n}$ corresponds to periodic observations $$t(n)=t_0+n\Delta t$$

The time index $\underline{n}$ may also represent the flight number for long-term maintenance. In practice, for each time index $\underline{n}$, a new estimate of the parameters is calculated during a time interval $I_{t(n)}$ around t(n).

Thus, the purpose of monitoring the regulator circuit 21*a* in operation is to detect anomalies of the circuit by monitoring variation of state parameters (a(n),b(n)).

More particularly, after reference filters $F_j^0(w)$ have been defined, the processor means 5 begin by recording measurements over time t(n) (often written t for greater concision).

In step E25, the digital measurements representing input and output variables (x(s),y(s)) are stored during times t in the memory buffer 23 of predetermined capacity so as to form an interval or sample occupying N measurements:

$$I_t=\{(x(s),y(s)); s \in [t-N+1, \ldots t]\}$$

In step E26, the processor means 5 are configured to test the stability of the N-measurement sample at each periodic instant $t(n)=n\Delta t$ (where $\Delta t$ is a predetermined duration that depends on the calculation speed of the processor means 5).

In step E27, when the N-measurement sample is stable, the processor means 5 are configured to identify the current flight regime. In the event of stability, the most probable current flight regime is identified and the quality of its classification is estimated:

$$Q_{FR} \in [0,1].$$

In step E28, the processor means 5 are configured to estimate a current rational filter $(F_j(w))_{j=1\ldots k}$ for the)) optimum set of ranks associated with the current flight regime identified in step E27.

At step E29, the processor means 5 are configured to compare the current polynomial $(F_j(w))_{j=1\ldots k}$ calculated in step E28 with the reference rational filter $(F_j^0(w))_{j=1\ldots k}$ corresponding to the same flight regime as calculated in step E24.

In step E30, the processor means 5 are configured to indicate that there is an anomaly in the behavior of the regulator circuit 21a when the difference between the current rational filter $(F_j(w))_{j=1\ldots k}$ and the reference rational filter $(F_j^0(w))_{j=1\ldots k}$ is greater than a predetermined value.

A difference (deviation) or distance between the two rational filters may be calculated from the zeros and poles of the polynomials and possibly from other information representing the acquisition context relating to the regulator circuit 21a.

The zeros (roots of $B_j$) and the poles (roots of A) are unique characteristics of rational filters. Thus, the statistical variation of these roots can be tracked in order to be able to detect an anomaly in the behavior of the regulator circuit 21a. Some of the roots may be complex, however all of the polynomials are real and under such circumstances, for each complex root, there exists a complex conjugate root, and it is thus possible to take account only of the real portions and imaginary portions that are positive. Experts can define indicators from particular combinations of these roots serving to identify anomalies.

It should be observed that in the absence of expert criteria, it is also possible to calculate the indicators automatically.

It should also be observed that when a polynomial is represented by all of its roots, it is possible to govern the behavior of the regulator circuit 21a over the entire spectrum of input signals. However, it may be more advantageous to govern the behavior of the model around a few specific frequencies that are genuinely meaningful.

A first technique for comparison between the current rational filter $(F_j(w))_{j=1\ldots k}$ and the reference rational filter $(F_j^0(w))_{j=1\ldots k}$ consists in estimating a stochastic difference between the two filters.

By way of example, the processor means 5 may be configured to calculate the mean square error (MSE) between the measured position $y$ and the position $\hat{y}$ estimated by the current filter, and then to compare this current error with the corresponding reference error $MSE_0$ obtained during calibration on the ground of the reference filter.

More particularly, the reference mean square error ($MSE_0$) is initially calculated between the output variable representing a real position of the actuators 29 as measured during bench testing stages and the corresponding output variable representing the position of the actuators 29 as estimated by the reference rational filter $(F_j^0(w))_{j=1\ldots k}$.

Thereafter, the current mean square error (MSE) is calculated between the current output variable representing the real position of the actuators 29 as measured during real time measurements and a corresponding output variable representing the position of the actuators 29 as estimated by the current rational filter $(F_j(w))_{j=1\ldots k}$.

It is thus possible to calculate the difference between the two filters by a ratio $e_0$ between the current mean square error (MSE) and the reference mean square error ($MSE_0$):

$$e_0 = \frac{MSE}{MSE_0}.$$

This ratio serves to test the accuracy of the current filter relative to the reference filter. The value of the ratio $e_0$ may possibly be less than 1 if the current filter is locally better adjusted than was the reference filter during bench testing. In contrast, when the value of the ratio $e_0$ is greater than a predetermined value (e.g. as a result of a statistical study of the ratio over normal initial data), then a behavior anomaly is indicated.

Another technique for comparing the current model and the reference model consists in the processor means 5 calculating indicators that track residual energy variation.

Thus, for each input variable $x_j(t)$ (from among the k inputs), the power spectrum density $|X_j(w)|^2$ is calculated by a Fourier transform of the auto-correlation function $R_{jj}(\tau)$ of the input variable or signal $x_j(t)$:

$$|X_j(w)|^2 = \int R_{jj}(\tau) e^{-iw\tau} d\tau \text{ with } R_{jj}(\tau) = E[x_j(t), x_j(t-\tau)]$$

Thereafter, a sequence $e=(e_j)_{j=1\ldots k}$ of local indicators $e_j$ is calculated by integration that is weighted by the current and reference rational filters $(F_j(w))_{j=1\ldots k}$ and $(F_j^0(w))_{j=1\ldots k}$ over a frequency bandwidth of each input variable $x_j(t)$:

$$e_j = \frac{1}{2\pi} \int (F_j(w) - F_j^0(w))|X_j(w)|^2 dw$$

The term $F_j(w)|X_j(w)|^2$ corresponds to the power density spectrum of the input variable $x_j(t)$.

It should be observed that in order to make calculation faster, account may be taken only of the frequency responses for each power spectrum $|X_j(w)|^2$ without calculating the integral.

Thereafter, a sequence $z=(z_j)_{j=1\ldots k}$ of local scores $z=e_j-\hat{e}_j$ is calculated using a correlation technique between the local indicators $e_j$, where $\hat{e}_j$ is a regression estimator between a local indicator $e_j$ and the other local indicators:

$$\hat{e}_j = E[e_j/e_i; i \neq j] \approx c_{j,0} + \sum_{i \neq j} c_{j,i} e_i$$

with $c_{j,i}$ being regression coefficients.

Furthermore, it is possible to calculate a global score $Z^2$ as a Mahalanobis distance measuring the dissimilarity between a sequence $z=(z_1)_{j=1\ldots k}$ of residues $z_j=e_j-\hat{e}_j$ and the mean $\bar{z}$ of z, calculated during the bench testing stages with a covariance matrix $\Sigma$. The global score $Z^2$ is then given by the following formula:

$$Z^2 = (z-\bar{z})^T \sum\nolimits^{-1} (z-\bar{z})$$

In order to minimize the risks of error when the flight regime is weakly identified, it is possible to define a final score $Q_{FR} \times Z^2$ by multiplying the global score $Z^2$ by the quality factor of the flight regime classification $$Q_{FR} \in [0,1]$$

A behavior anomaly alert is then indicated when the value of the final score $Q_{FR} \times Z^2$ exceeds a predetermined value. By way of example, this value may be determined by taking account of the distribution of $Z^2$ (here, $Z^2$ follows a known distribution law, namely a chi-square ($\chi^2$) distribution for which the quantiles are known).

When an anomaly is detected, it is then possible to analyze the indicators in greater detail in order to discover the faulty element of the regulator circuit 21a of the engine 1.

It is possible to track each normalized local indicator $$\tilde{z} = \frac{(z_j - \bar{z}_j)}{\sigma_j}$$

where $\sigma_j$ is the $j^{th}$ diagonal element of the covariance matrix $\Sigma$.

In a preferred implementation, the various steps of the method of the invention are executed by means of program code instructions.

Consequently, the invention also provides a computer program product, the program being suitable for being implemented in the processor means or a computer system, the program including code instructions adapted to implement a method of the invention as described above.

The program may use any programming language, and may be in the form of source code, object code, or of code intermediate between source code and object code, such as in a partially compiled form, or in any other desirable form.

The invention also provides a data medium that is readable by a computer, and including instructions of a computer program as mentioned above.

The data medium may be any entity or device capable of storing the program. For example, the medium may comprise storage means such as a read-only memory (ROM), e.g. a compact disk (CD) ROM, or a microelectronic circuit ROM, or some other storage means.

Furthermore, the data medium may be a transmissible medium such as an electrical or an optical signal, that may be conveyed via an electrical or optical cable, by radio, or by other means.

Alternatively, the data medium may be an integrated circuit in which the program is incorporated, the circuit being adapted to execute or to be used in the execution of the method in question.

The invention claimed is:

1. A method of detecting anomalies in an aeroengine, the method comprising:
defining a reference behavior model and a current behavior model for a controller of the aeroengine by using time regression that models a behavior of the controller as a function of a data set relating to the controller and including measurements of past behaviors, and state and command measurements of the controller;
continuously recalculating the current behavior model for each new data set; and
detecting a behavior anomaly of the controller representing an operating anomaly of the engine by monitoring statistical variation between the current behavior model and the reference behavior model,
wherein the reference behavior model is defined for each flight regime using an initial data set relating to the controller,
wherein the current behavior model is defined for a current flight regime using a current data set,
wherein each of the reference behavior model and the current behavior model is a rational filter, the reference rational filter and the current rational filter being defined using a plurality of mathematical formulae, and each formula expressing an output vector at a present instant $y(t)$ representing a current behavior of the controller as a function of output vectors at preceding instants $y(t-i)$ representing earlier behavior measurements, and as a function of input vectors comprising an input vector at a present instant $x(t)$ and input vectors at preceding instants $x(t-i)$, each input vector x being constructed by concatenating the command and state measurements of the controller,
wherein each mathematical formula of the plurality of mathematical formulae corresponds to a linear equation between output vectors y and the input vectors x described analytically in the time domain by:

$$A(q)y=B(q)x$$

with $A(q)$ being a real polynomial having a form:

$$A(q)=1+a_1 q^{-1}+a_2 q^{-2}+\ldots+a_{ra}q^{-ra}$$

and $B(q)$ being a real polynomial in which each coefficient is a line vector having a same dimension as the input vector x and having a form:

$$B(q)=b_0+b_1 q^{-1}+b_2 q^{-2}+\ldots+b_{rb}q^{-rb}$$

with $$q^{-1}(x(t))=x(t-1), \text{ and}$$

wherein the detecting the behavior anomaly includes
extracting current zeroes and poles from the polynomials associated with the current rational filter corresponding to the current flight regime,
extracting reference zeroes and poles from the polynomials associated with the reference rational filter corresponding to the current flight regime, and
determining current normality indicators for the current flight regime from the current zeros and poles,
determining reference normality indicators for the current flight regime from the reference zeros and poles, and
determining the behavior anomaly of the controller when a distance between the current normality indicators and the reference normality indicators is greater than a predetermined value.

2. A method according to claim 1,
wherein the defining the reference behavior model includes splitting the initial data set into a plurality of uniform intervals representing different flight regimes identified by regime indicators defined using criteria established by experts.

3. A non-transitory computer readable medium including computer executable instructions for implementing the detection method according to claim 1 when executed by a processor.

4. A system for detecting anomalies in an aeroengine, the system comprising:
means for defining a reference behavior model a current behavior model of control means of the aeroengine by using a time regression that models a behavior of the control means as a function of a data set relating to the control means and including measurements of past behaviors and command and state measurements of the control means;
means for continuously recalculating the current behavior model for each new data set; and
means for detecting a behavior anomaly of the controller representing an operating anomaly of the engine by monitoring statistical variation between the current behavior model and the reference behavior model
means for defining the reference behavior model for each flight regime using an initial data set relating to the controller;

means for defining the current behavior model for a current flight regime using a current data set;

wherein each of the reference behavior model and the current behavior model is a rational filter, wherein the system further comprises means for defining the reference rational filter and the current rational filter using a plurality of mathematical formulae, each formula expressing an output vector at a present instant y(t) representing a current behavior of the control means as a function of output vectors at preceding instants y(t−i) representing earlier behavior measurements, and as a function of input vectors comprising an input vector at a present instant x(t) and input vectors at preceding instants x(t−i), each input vector x being constructed by concatenating the command and state measurements of the control means, means for using the plurality of mathematical formulae to define a reference rational filter for each flight regime, and means for using the plurality of mathematical formulae to calculate a current rational filter relating to the current data set and to the current flight regime, wherein each mathematical formula of the plurality of mathematical formulae corresponds to a linear equation between output vectors y and the input vectors x described analytically in the time domain by:

$$A(q)y=B(q)x$$

with A(q) being a real polynomial having a form:

$$A(q)=1+a_1q^{-1}+a_2q^{-2}+\ldots+a_{ra}q^{-ra}$$

and B(q) being a real polynomial in which each coefficient is a line vector having a same dimension as the input vector x and having a form:

$$B(q)=b_0+b_1q^{-1}+b_2q^{-2}+\ldots+b_{rb}q^{-rb}$$

with $$q^{-1}(x(t))=x(t-1), \text{ and}$$

wherein the means for detecting the behavior anomaly includes means for extracting current zeros and poles from the polynomials associated with the current rational filter corresponding to the current flight regime, means for extracting reference zeros and poles from the polynomials associated with the reference rational filter corresponding to the current flight regime, means for determining current normality indicators for the current flight regime from the current zeros and poles, means for determining reference normality indicators for the current flight regime from the reference zeros and poles, and means for determining the behavior anomaly of the controller when a distance between the current normality indicators and the reference normality indicators is greater than a predetermined value.

5. A system according to claim 4, further comprising:
means for collecting the initial data set relating to the control means; and
means for splitting the initial data set into a plurality of uniform intervals representing different flight regimes identified by regime indicators defined using criteria established by experts.

6. A system according to claim 5, further comprising:
means for acting over time to collect the current data set relating to the control means;
means for storing content of the current data set for a predetermined time period in a memory buffer;
means for using the current data set to calculate an estimate of regime indicators to identify the current flight regime specific to the predetermined time period;
means for calculating the current behavior model corresponding to the current data set and to the current flight regime; and
means for estimating a behavior distance between the current behavior model and the reference behavior model corresponding to the current flight regime.

7. A system according to claim 6, further comprising:
means for standardizing the initial data set by subtracting by a lowpass filter and by normalizing relative to local variance estimated for each flight regime.

8. A system according to claim 4, further comprising:
means for using expert criteria to calculate normality indicators for the current flight regime from the current zero and poles and from other information representing an acquisition context relating to the control means; and
means for detecting a behavior anomaly of the control means when a distance between the normality indicators and a corresponding normality threshold is greater than a predetermined value.

9. A system according to claim 4, further comprising:
means for defining a distance by a function adapted to the dynamic range of the control means.

10. A system according to claim 4, wherein the control means includes a regulator circuit that operates actuators controlling stator valves on a low pressure compressor and a high pressure compressor of a turbojet and serving to modify geometries of compressors as a function of the flight regime, and the data set relating to the regulator circuit includes data about positions of actuators and external data including a first speed of rotation N1 of a shaft of the low pressure compressor, a second speed of rotation N2 of a shaft of the high pressure compressor, a pressure P downstream from the compressors, a fuel flow rate W, and a command for the actuators.

11. A system according to claim 10, further comprising:
means for defining a stationary regime discrete autoregressive filter for modeling the behavior of an output variable at a present instant y(t) corresponding to the current positions of the actuators as a function of output variables at preceding instants y(s; s<t) corresponding to earlier positions of the actuators and as a function of input variables $$x(s)=(x_j(s); s\leq t)_{j=1 \ldots k}$$

corresponding to the external data at past and present instants, the autoregressive filter being expressed in a frequency spectrum w by a rational filter $(F_j(w))_{j=1 \ldots k}$ (31) of polynomial fractions having a form:

$$F_j(w) = \frac{B_j(w)}{A(w)}$$

where $$B_j(w)=b_{j,0}+b_{j,1}w+\ldots+b_{j,rj}w^{rj}$$

and $$A(w)=1-a_1w-\ldots-a_{r0}w^{r0};$$

means for collecting initial digital data representing the initial input and output variables ($x^0(s)$, $y^0(s)$) measured and stored during bench testing stages;

means for identifying flight regimes from the initial digital data;

means for calculating, for each flight regime, an optimal set of ranks $r_j$ and $r_0$ of the polynomial fractions of the rational filter $(F_j(w))_{j=1\ldots k}$; and means for calculating, for each flight regime, a reference rational filter $(F_j^0(w))_{j=1\ldots k}$.

12. A system according to claim 11, further comprising:

means for storing over time digital measurements representing input and output variables ($x(s),y(s)$) in a memory buffer to form an N-measurement sample:

$$I_t = \{(x(s),y(s)); s \in [t-N+1,\ldots t]\};$$

means for testing stability of the N-measurement sample;

means for identifying the current flight regime and for estimating the quality of its classification $$Q_{FR} \in [0,1];$$

means for estimating a current rational filter $(F_j(w))_{j=1\ldots k}$ for the optimum set of ranks associated with the current flight regime;

means for comparing the current rational filter $(F_j(w))_{j=1\ldots k}$ with the reference rational filter $(F_j^0(w))_{j=1\ldots k}$ corresponding to the same flight regime; and means for indicating a behavior anomaly of the regulator circuit when a difference between the current rational filter $(F_j(w))_{j=1\ldots k}$ and the reference rational filter $(F_j^0(w))_{j=1\ldots k}$ is greater than a predetermined value.

13. A system according to claim 12, further comprising:

means for calculating a reference mean square error $MSE_0$ between an output variable representing a real position of the actuators as measured during bench testing stages and a corresponding output variable representing a position of the actuators as estimated by the current reference rational filter $(F_j^0(w))_{j=1\ldots k}$;

means for calculating a current mean square error MSE between a current output variable representing a real position of the actuators measured during real time measurements and a corresponding output variable representing a position of the actuators estimated by the current rational filter $(F_j(w))_{j=1\ldots k}$;

means for calculating a difference defined by a ratio $e_0$ of the current mean quadratic error MSE and the reference quadratic error $MSE_0$:

$$e_0 = \frac{MSE}{MSE_0};$$

and means for indicating an anomaly when the ratio $e_0$ is greater than a predetermined value.

14. A system according to claim 12, further comprising:

means for calculating a sequence $e=(e_j)_{j=1\ldots k}$ of local indicators $e_j$ by integration weighted by the current and reference rational filters $(F_j(w))_{j=1\ldots k}$ and $(F_j^0(w))_{j=1\ldots k}$ over a frequency bandwidth of each input variable $x_j(t)$:

$$e_j = \frac{1}{2\pi}\int (F_j(w) - F_j^0(w))|X_j(w)|^2 dw$$

with $$|X_j(w)|^2 = \int R_{jj}(\tau)e^{-iw\tau}d\tau$$

and $$R_{jj}(\tau) = E[x_j(t), x_j(t-\tau)];$$

means for calculating a sequence $z=(z_j)_{j=1\ldots k}$ of local scores $z_j = e_j - \hat{e}_j$ using a correlation technique between the local indicators $e_j$, where $\hat{e}_j$ is an estimator between a local indicator $e_j$ and the other local indicators:

$$\hat{e}_j = E[e_j/e_i; i \neq j] \approx c_{j,0} + \sum_{i \neq j} c_{j,i} e_i$$

with $c_{j,i}$ being regression coefficients;

means for calculating a global score $Z^2$ using a Mahalanobis distance:

$$Z^2 = (z-\bar{z})^T \Sigma^{-1}(z-\bar{z})$$

where $\bar{z}$ is a mean of z calculated during bench testing stages with a covariance matrix $\Sigma$;

means for calculating a final score $Q_{FR} \times Z^2$ by multiplying the global score $Z^2$ by the classification quality factor of the flight regime $Q_{FR} \in [0,1]$; and means for indicating a behavior anomaly alert when the value of the final score $Q_{FR} \times Z^2$ exceeds a predetermined value.

* * * * *